(No Model.)
A. MOLINARI.
PISTON FOR SYRINGES.
No. 449,883. Patented Apr. 7, 1891.
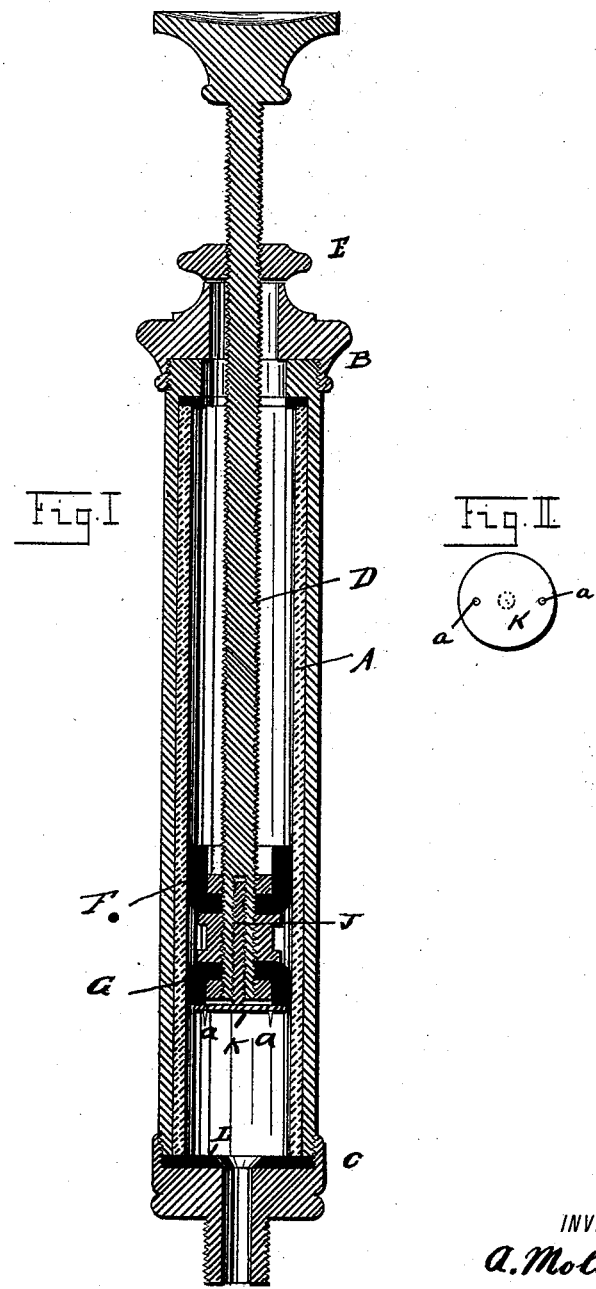
WITNESSES:
INVENTOR
A. Molinari
BY
ATTORNEYS.

UNITED STATES PATENT OFFICE.

ANTON MOLINARI, OF WOOD RIDGE, NEW JERSEY.

PISTON FOR SYRINGES.

SPECIFICATION forming part of Letters Patent No. 449,883, dated April 7, 1891.

Application filed November 4, 1890. Serial No. 370,266. (No model.)

*To all whom it may concern:*

Be it known that I, ANTON MOLINARI, a citizen of the United States, and a resident of Wood Ridge, in the county of Bergen, State of New Jersey, have invented certain new and useful Improvements in a Piston for Syringes, of which the following is a specification.

This invention relates to improvements in pistons for syringes, especially hypodermic syringes; and the object of my invention is to provide a piston for syringes which is so constructed that its packing can be adjusted to fit snugly and tightly in the cylinder.

The invention consists in the combination of a piston-rod having a screw-threaded bore at its lower end, a threaded stem screwed into said bore and a disk on the lower end of said stem, which disk is provided on its under side with points or projections that can be forced into the bottom washer of the cylinder to prevent the piston from turning, whereby the stem is screwed into the bore more or less and the washers of the piston compressed.

In the accompanying drawings, Figure I is a longitudinal sectional view of a syringe provided with my improved piston, and Fig II is a bottom view of the piston.

Similar letters of reference indicate corresponding parts.

The cylinder A and the end pieces B and C and the piston-rod D, provided with a screw-thread on which a check-nut E is mounted, are all of the usual construction. On the lower end of the piston-rod D the two cup-shaped piston-packings F and G are clamped by means of nuts and fit snugly in the cylinder.

The piston-rod D is provided in its lower end with a longitudinal bore, that is provided with a screw-thread. The screw-threaded rod J is screwed into the threaded bore in the lower end of the piston-rod, and on the lower end of said rod or stem J a disk K is secured, which disk is of such diameter that its rim is almost in contact with the sides of the cylinder, thus completely covering the bottom of the washer G and preventing the liquid drawn into the syringe from affecting said bottom washer G injuriously. Two points or projections *a* project from the lower under side of the disk K and are adapted to be forced into the bottom washer L in the cylinder A. In case the piston does not fit snugly in the cylinder and there is a leak in the bottom packing the washer G must be expanded so as to be pressed more firmly against the sides of the cylinder. To thus adjust the piston the same is forced down until the points *a* on the disk K enter the washer L and prevent the piston from turning. Now, the piston-rod is turned, the stem or rod J is screwed a greater or less distance into the bore in the lower end of the piston-rod, and thereby the washer G is compressed and spread.

Having thus described my invention, I claim as new and desire to secure by Letters Patent—

In a syringe, the combination, with a cylinder, of a soft washer in the lower end of the same, a piston-rod provided with a bore screw-threaded at its lower end, a stem provided with a screw-thread adapted to engage the screw-thread at the lower end of said bore, a disk permanently and rigidly fastened to the lower end of said stem and at the lower end of the piston, and two or more points or projections projecting from the lower end of said disk and adapted to be forced into the soft washer at the lower end of the cylinder to prevent said disk from turning while the piston-rod is being turned on its longitudinal axis, substantially as set forth.

In testimony that I claim the foregoing as my invention I have signed my name in presence of two subscribing witnesses.

ANTON MOLINARI.

Witnesses:
  HENRY DIPPEL,
  ANDREW EGERT.